March 5, 1957
G. E. BANNING
2,784,330
CONTROLLED REACTION, VARIABLE
SPEED, CONSTANT TORQUE MOTOR
Filed Dec. 17, 1953
3 Sheets-Sheet 1
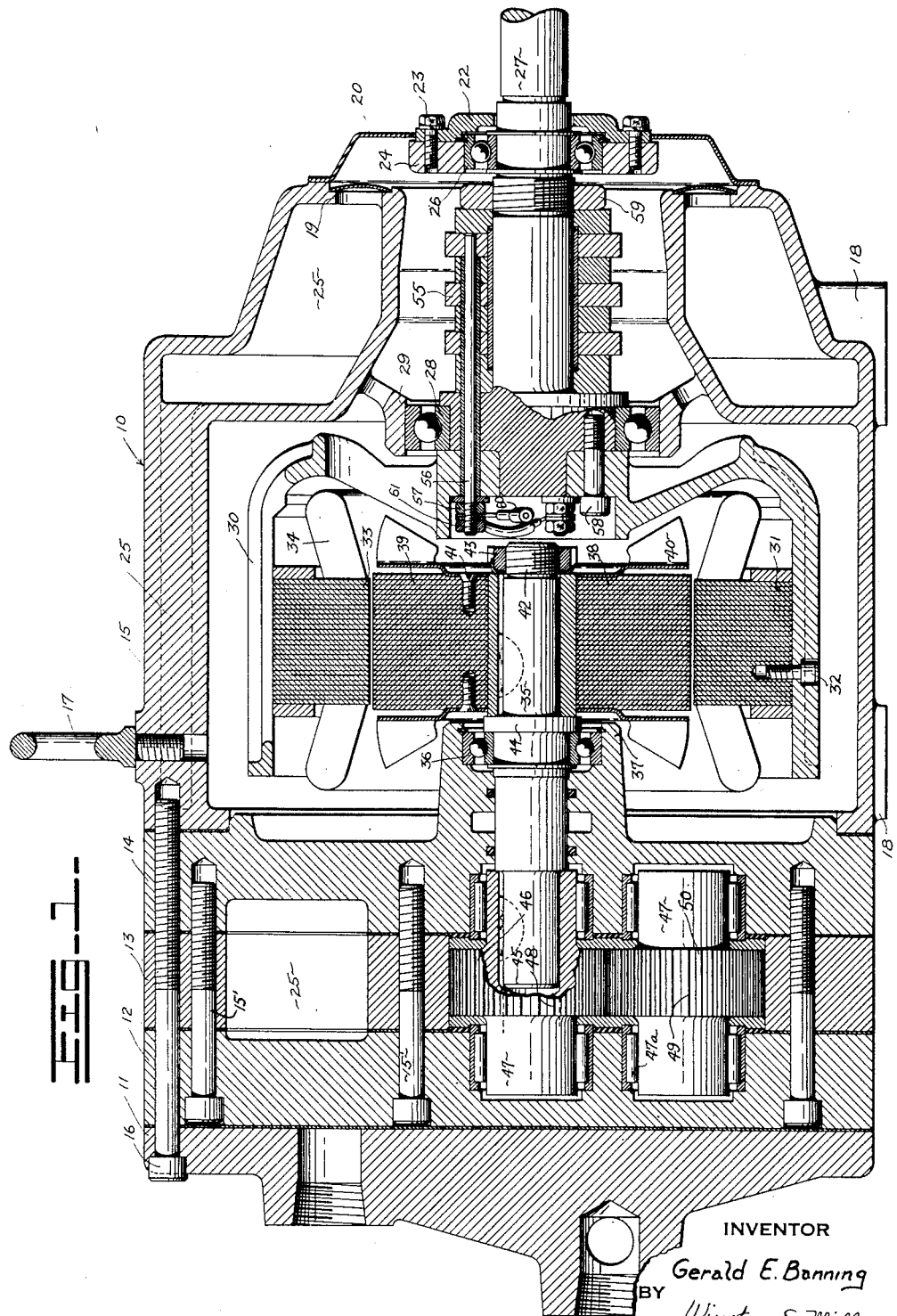
INVENTOR
Gerald E. Banning
BY
Winston E. Miller
ATTORNEY

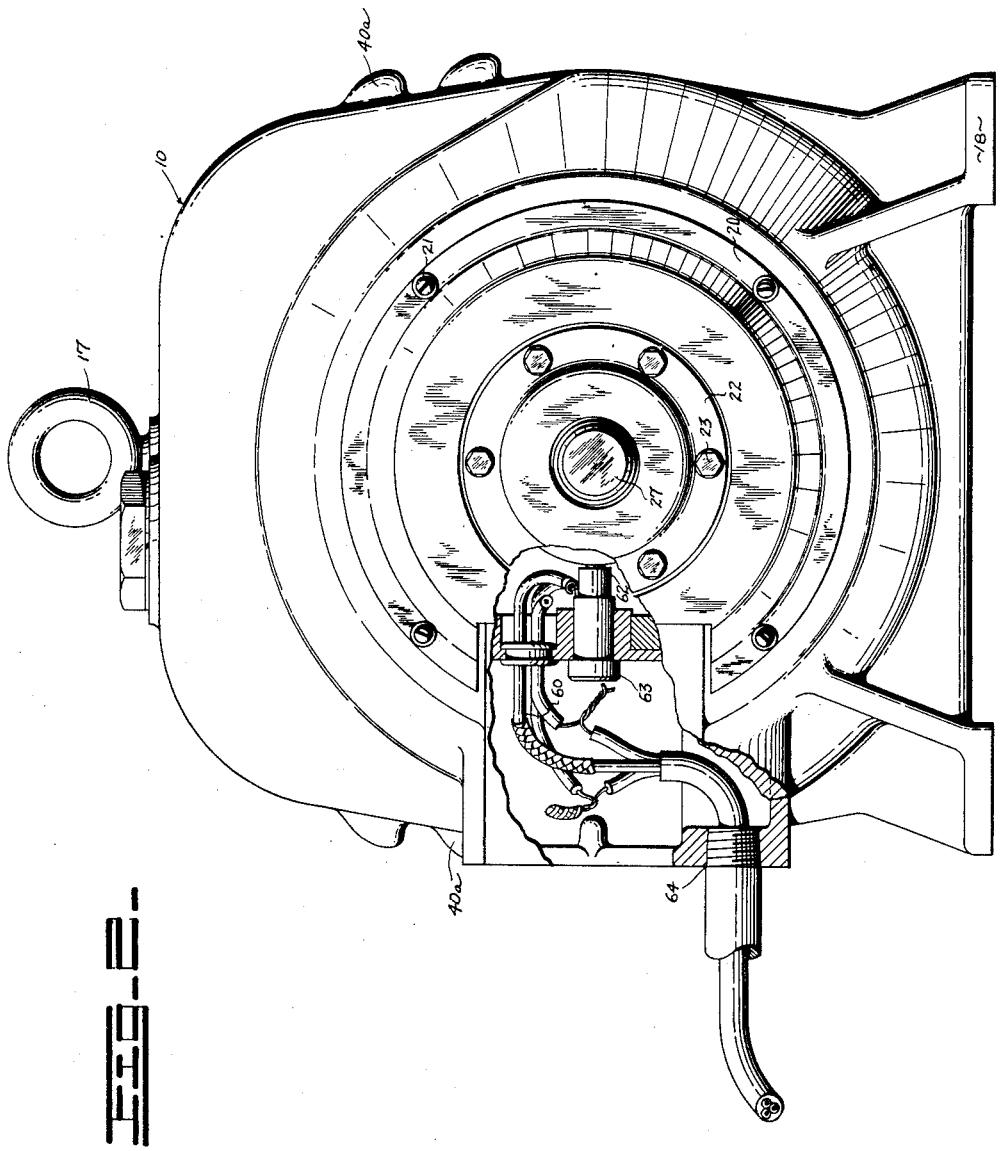

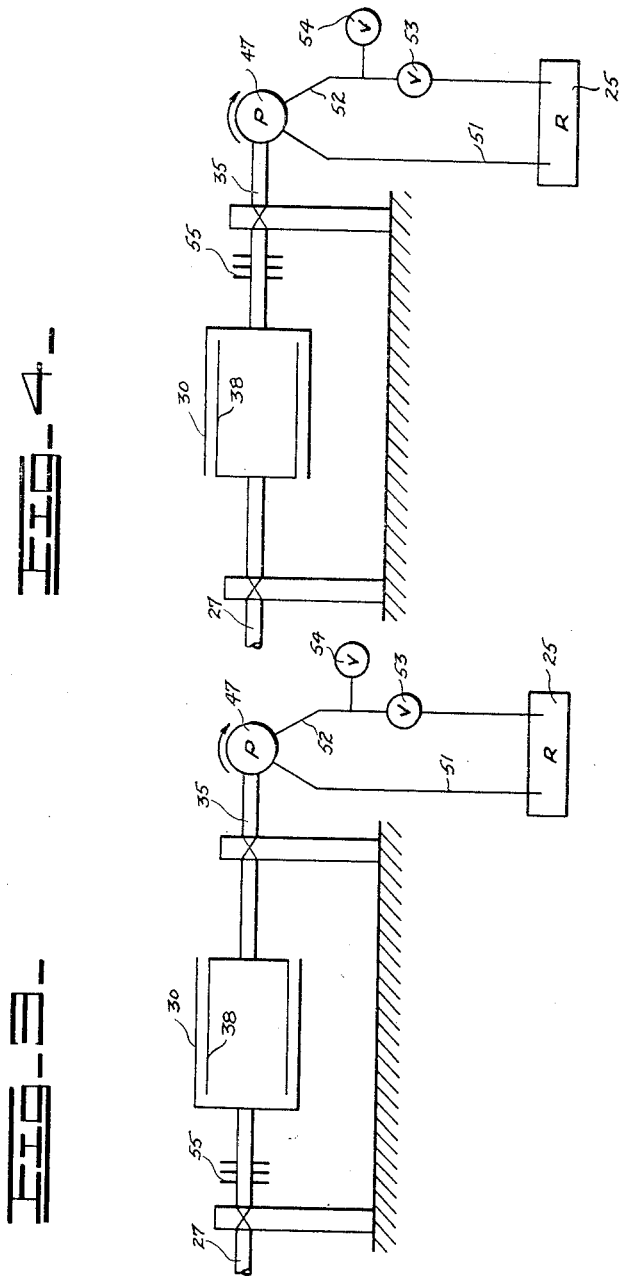

United States Patent Office 2,784,330
Patented Mar. 5, 1957

2,784,330

CONTROLLED REACTION, VARIABLE SPEED, CONSTANT TORQUE MOTOR

Gerald E. Banning, Saginaw, Mich., assignor to Banning Electrical Products Corporation, Saginaw, Mich., a corporation of Michigan Application December 17, 1953, Serial No. 398,809

1 Claim. (Cl. 310—119)

This application is a continuation-in-part of my prior application, Serial Number 326,989, filed December 19, 1952, now abandoned.

The invention relates generally to new and useful improvements in variable speed, constant torque motors and more particularly to an efficient, rugged and compact polyphase alternating current hydraulically controlled motor having a rotating stator and a rotating rotor. It is specifically intended as an improvement over the conventional variable speed motor which operates on the principle of free rotation or "slip" of the rotor about a stationary stator.

The standard variable speed motor requires an excessive number of accessories such as, commutators, external resistors, rectifiers, etc. It is my objective to eliminate the need for these accessories and as well, to eliminate other inherent disadvantages of the conventional electric drive systems in present use. It is also my objective to develop an inexpensive prime mover, hereinafter more fully described, that utilizes hydraulic and electrical reactions and produces a higher efficiency of performance with infinite speed control.

Another of the objects of the present invention is the provision of means whereby a motor having these and like characteristics may be inexpensively manufactured, quickly assembled and easily maintained.

A further object is the provision of means to obtain a low speed motor having the same frame size as a high speed conventional motor of the same horsepower and a motor that represents a vast improvement over the conventional series-type direct current motor or the slip-ring type alternating current motor.

Another object of the invention is the provision of means that eliminate over fifty percent of the heat loss of the conventional variable speed motor, a feature resulting from the coaction of hydraulics that control the counter-electromotive forces of the rotor and maintain the motor electrical characteristics and output at highest efficiency.

A further object of the present invention is the provision of a motor having forward and rearward speed ranges and low starting current rise.

Another object of the invention is the provision of a motor which is satisfactorily ventilated at slower speeds and which does not require long duration starting or reversing current.

Another object of the invention is the provision of a direct drive, self-contained motor which will operate efficiently with small quantities of liquid.

Other objects and purposes of the invention will become apparent to persons familiar with this type of equipment upon reference to the accompanying drawings and upon reading the following specification.

In meeting the above objects and purposes, as well as others incidental thereto and associated therewith, I have utilized the combination of a rotating stator, and a rotating rotor connected with a constant volume hydraulic gear pump, and have created means for controlling their respective movements so as to maintain constant torque on the output shaft over an infinitely variable speed range from full-speed R. P. M. to zero R. P. M.

The invention accordingly comprises the elements, features of construction, and arrangement of parts which will be exemplified in the structures hereinafter described, and the scope of the application of which will be indicated in the following claim.

For illustration of a preferred embodiment of the invention, attention is directed to the accompanying drawings in which:

Figure 1 is a longitudinal sectional view of the improved motor;

Figure 2 is an end elevational view of the improved motor;

Figure 3 is a schematic layout of the motor and hydraulic system indicated in Figure 1; and Figure 4 is a revised embodiment of the schematic layout indicated in Figure 3.

Referring to the drawings wherein like numerals designate like parts, it may be seen that numeral 10 generally refers to an elongated circular housing built up of sections 11, 12, 13, 14, and 15, all of the sections being tightly pressed together. The sections 12, 13 and 14 are joined together by the bolts 15', and sections 12, 13 and 14 are secured to sections 11 and 15 by means of the bolts 16, located at varying intervals near the edge of all of said sections. A ring 17 threadably engages the upper side of section 15 and is adapted for use in moving the motor. The base supports 18 are integral with the underside of section 15 of the housing and have vertically disposed openings therein, not shown, for fastening the housing to the earth. The smaller open end 19 of section 15 is adapted to receive a circular cover plate 20 which is secured to the outer circumference of the end 19 by the bolts 21, located at varying intervals about the edge thereof. A smaller cover plate 22 overlaps the inner ends of the cover plate 20, and the bolts 23, when tightened, firmly support the mounting 24 and the cover plates 20 and 22 together. A reservoir 25 is situated inside the housing and totally encompasses the housing, and is provided for use in containing fluid used in the motor operation and for evenly dissipating heat in the hydraulic system.

A bearing assembly 26 is supported in the mounting 24 and is designed to snugly engage the intermediate section of the drive shaft 27. A larger bearing assembly 28 is supported in the mounting 29 in close proximity to one inner wall of the reservoir 25, and is intended to support the drive shaft 27.

A rotary stator 30 is suitably attached in section 15 of the housing to the inner end of the drive shaft 27 and rotates with the drive shaft. The stator-core 31 is attached to the stator by the bolts 32, and carries a stator-winding 33 which has end turns 34. The stator-core is constructed of steel laminations that are wound with insulated copper wire for a definite number of magnetic poles and these laminations are firmly keyed in position.

A shaft 35 is coaxially aligned inside the housing and the intermediate section of the shaft 35 is supported in a bearing assembly 36, said assembly being mounted in the center projection 37 of section 14 of the housing.

A rotor 38 carries a rotor-winding 39, and has axially extending fan-blades 40 fastened at each end thereof by the screws 41. The fan blades act in conjunction with the stator 30 to provide for constant cooling at any speed of the motor. The vents 40a are situated on either side of the housing and provide for the intake and discharge of air from the housing. The rotor 38 is firmly keyed to the shaft 35 for rotation therewith, and is in telescoping engagement with the stator 39. The rotor is likewise built up of steel laminations and copper or aluminum conductors are cast into slots in the rotor and short-circuited by end rings of like material. The end 42 of the shaft 35 is threadably adapted to receive internal threads of the nut 43, which when locked in position tightly presses one inner edge of the rotor 38 against the oppositely disposed face of the flange 44 of the shaft 35.

The end 45 of the shaft 35 is in keyed engagement with one of the gears 46 of the constant volume hydraulic pump 47, the teeth 48 of said gear being adapted to mesh with the teeth 49 of the gear 50, whereby upon rotation of the rotor 38 the shaft 35 and the pump 47 move in unison. The pump units 47, 47 are suitably mounted in needle bearings 47a in sections 12 and 14 of the housing.

As best indicated in Figure 3, an inlet line 51 leads from the reservoir 25 into the pump 47 and therethrough the discharge line 52 back to the reservoir. A valve 53 is interposed in the discharge line 52, and a compensating valve 54 is likewise interposed in line 52, whereby upon utilizing said valve 54 the load demand on the drive shaft 27 is automatically balanced by the action of the pump 47.

The numeral 55 denotes collector rings which are insulated from each other and are supported to the stator 30. The conductors 56 are secured in position, one to each collector ring, by the lock nuts 57, and the bolt 59 is threadably adapted to engage like threads on the drive shaft 27 and additionally supports the collector ring assembly to the drive shaft 27 and the stator 30. The bolts 58 adjacent the lock nuts 57 securely fasten the stator 30 to the drive shaft 27. The wires 60 conduct energizing current and are fastened to the rods 56 by the bolts 61, and the brushes 62, supported by the brush holders 63, contact the collector rings 55. A suitable entry for the wiring is provided by the opening 64 in the lower side of section 15 of the motor housing.

The motor described herein comprises a polyphase-wound stator and a squirrel-cage rotor, both of which are free to rotate. The torque reaction which appears between the stator frame and the earth in a conventional motor is used to control the output characteristics of the motor through the use of hydraulic control.

It is well recognized that the torque produced by an induction motor represents a force directed by the rotor to the load, and that there must be an equal and opposite force or reaction present to balance this torque. In a conventional motor this torque reaction appears between the stator frame and the earth to which the frame is attached, and since the stator frame is mechanically fixed to the earth there is no possible method of utilizing this reaction to control the motor.

If it be assumed that the stator and stator frame are disengaged from the earth and mounted on bearings, and that the stator is energized and free to rotate, and that there is no load on the motor, the rotating magnetic field in the stator windings will create a torque on the rotor. There must be an equal and opposite torque created on the stator and since both the stator and the rotor are free to rotate, each will accelerate in opposite directions until the relative speed between the two is approximately equal to synchronous speed. Neglecting friction, the speed of each member with respect to the earth will be approximately one-half synchronous speed. The rotor will rotate in the direction of the magnetic field and the stator will rotate in an opposite direction. If it be further assumed that an adjustable braking device is coupled to the stator shaft and adjusted to prevent the stator from turning, the motor will operate as a conventional alternating current squirrel cage induction motor with the exception that the torque reaction, or point of pry, now appears at the braking device instead of between the stator frame and the earth.

If the braking device were partially released there would be less resistance to the rotation of the stator, causing the stator to rotate in an opposite direction to the rotor and tending to increase the relative speed betwen the rotor and the stator. This causes the rotor to decelerate until the relative speed again reaches synchronous speed minus slip. The stator will accelerate until the torque reaction developed by the braking device again balances the torque required by the load. The rotor speed will now be equal to synchronous speed minus slip and stator speed, and the power supplied by the motor will be that required by the load at this reduced speed.

If the braking device described above is a constant volume displacement pump, the motor is capable of supplying constant torque over an infinitely variable speed range from full-load R. P. M. to zero R. P. M. of the drive shaft. The slip will remain proportional to the power demanded by the load as in a conventional constant speed induction motor, and the slip between the rotor and stator is not increased as the speed of the drive shaft decreases.

Referring now to the schematic drawing indicated in Fig. 3, if the valve 53 is fully closed the stator will turn at full speed and supply full power to the load. Assuming that the load requires a constant torque at variable speeds, if the valve 53 is partially opened the pump will accelerate until a speed is reached whereby the pressure produced in the line 52 between the pump and the valve 53 is sufficient to produce the torque reaction demanded by the load. This pressure is very small in relation to the rated pressure of the pump, as for example, in a pump rated at 10 horsepower, 1500 pounds per square inch, the pump will only develop pressure of 60 pounds per square inch to produce the rated torque of a 3 horsepower motor. Moreover, a larger pump will develop even less pressure. As there is now a flow of hydraulic fluid in the system, small losses may appear, but these losses do not approach the inherent losses present in variable speed electric motors operating on the slip principle.

As the rotor accelerates, the stator will decelerate until their relative speeds are again synchronous speed minus slip. The load is being supplied with the same torque as before, but at a reduced speed on the drive shaft 27. The drive shaft torque is no longer a function of slip but rather depends on the amount of torque reaction supplied by the pump. The motor is now supplying less power to the load and the slip between the stator and the rotor will decrease proportionately. The motor is only aware of the actual power required by the load and will have the characteristics of a conventional motor running at less than full-load.

As the valve 53 is infinitely adjustable from its fully closed position to its fully opened position, the speed of the drive shaft is infinitely variable over this range. If the valve 53 is in its fully opened position, the rotor will rotate at synchronous speed minus slip, and the stator will be held at a standstill by the load torque. The valve 53 may be closed to create sufficient reaction torque to hold the load at zero R. P. M., since the controllable speed range of the motor is infinitely adjustable from normal full-load speed to zero R. P. M.

If the motor is started under load and the valve 53 is fully opened, the motor operates under essentially no-load conditions and starting current duration is kept at a minimum. After the rotor has reached its full speed said valve 53 is closed in order to bring the load up to speed. As the valve 53 may be closed to a preset value, the pump will cause a hydraulic pressure to be built up in the line 52 between the pump and the valve 53. This pressure will appear as a reaction torque to the stator and the stator will accelerate, driving the load with a torque equivalent to the pressure developed by the pump. The torque will be greater than the running torque required by the load and actually is the accelerating torque. The stator will accelerate in a direction opposite to that of the rotor, tending to increase the relative speed between the two. The speed of the rotor must now decrease, but cannot do so instantaneously because of its inertia. This inertia now keeps the pressure developed by the pump at a value necessary to supply sufficient reaction torque to accelerate the load. When the load reaches the speed set by the valve 53, the speed of the rotor will have decreased to a point where the relative speed between the stator and the rotor is again synchronous speed minus slip, and the pump will now produce only sufficient torque reaction to supply the running torque required by the load. In other words, during the starting period the energy stored in the mass of the rotating rotor is used to help accelerate the load by the increased torque reaction developed in the pump. This will have the effect of accelerating the load much faster than in the conventional motor.

The tendency for the relative speed between the stator and the rotor to increase during the accelerating period, or to become over-synchronous, will tend to decrease the slip between the rotor and the stator, which in turn results in a tendency for the speed of the rotor to decrease while the load is accelerating. The degree that this tendency is present in the motor depends upon the moment of inertia between the member driving the load and the member creating the torque reaction.

It will be apparent to those skilled in the art that the principal difference between the motor described herein and the conventional induction motor lies in the fact that the output speed is controlled by the amount of torque reaction applied to the shaft 35, and not by the amount of slip between the rotor and the stator.

By means of controlled reaction it is now possible to overcome the inherent inefficiency of conventional alternating current drive systems operating on the slip principle, and to provide a motor having rated torque at zero R. P. M. The motor does not overheat as the current demand is totally dependent upon the amount of power required by the load.

Various controls may be added to the hydraulic system to give the motor any characteristic demanded by the particular application. The valve 53, compensating valve 54, reservoir and pump may be mounted in a variety of positions and if desired may be pilot operated from a remote control panel, thereby giving maximum flexibility to the control system. Also, I wish to indicate that the generic term "magnetic elements" refers to both the rotor and the stator, since under substantially all conditions they perform interchangeable functions.

For purposes of description and as indicated in Figure 1, and diagrammatically in Figure 3, the pump is coupled to the shaft 35, and the load is coupled to the drive shaft 27 and the stator. These conditions can be reversed (Figure 4) with substantially similar results. Particularly with drive shaft loads requiring speedy acceleration, I have found it advisable to attach the drive shaft to the rotor and to couple the pump with the stator. By engaging the pump to the stator and the rotor to the drive shaft, as aforesaid, the inertia of the rotor is much less than the inertia of the stator and faster acceleration is thereby accomplished.

While I have illustrated and described a particular embodiment of my invention, modifications thereof will occur to those skilled in the art. I desire it to be understood, therefore, that the invention is not to be limited to the particular arrangements disclosed, and I intend in the appended claim to cover all modifications which do not depart from the spirit and scope of the invention.

I claim:

In a machine of the class described, a housing having air vents thereon and composed of separable sections, means for joining together all of the sections, a rotor and a first shaft bearingly mounted in the housing, a rotor telescoping stator supported in the housing and including a core and windings, axially extending fan blades on the rotor, means whereby the stator and the fan blades cool the machine at all speeds thereof, a second shaft rotatably supporting the stator and coaxially positioned with respect to the first shaft, collector rings having the elements thereof connected to the windings of the stator, brushes within the housing and secured thereto and engaging the collector rings, a fluid reservoir encompassing a portion of the interior of the housing, a constant volume displacement pump bearingly mounted in one section of the housing and connected to be driven by the first shaft, means in the pump outlet for controlling a circulation of fluid through the pump whereby constant torque is maintained on the second shaft over a continuously variable speed range and the speed of the second shaft is controlled by the amount of torque reaction applied to the first shaft.

References Cited in the file of this patent
UNITED STATES PATENTS

| | | |
|---|---|---|
| 516,916 | Coleman | Mar. 20, 1894 |
| 711,663 | Herdman | Oct. 21, 1902 |
| 913,757 | McLeod | Mar. 2, 1909 |
| 1,835,811 | Pugsley | Dec. 8, 1931 |
| 2,309,904 | Hunsdorf | Feb. 2, 1943 |